United States Patent
Kanno

(10) Patent No.: US 10,974,723 B2
(45) Date of Patent: Apr. 13, 2021

(54) DRIVE FORCE CONTROL SYSTEM FOR VEHICLE

(71) Applicant: TOYOTA JIDOSHA KABUSHIKI KAISHA, Toyota (JP)

(72) Inventor: Yoshihito Kanno, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 151 days.

(21) Appl. No.: 16/207,643

(22) Filed: Dec. 3, 2018

(65) Prior Publication Data

US 2019/0184992 A1 Jun. 20, 2019

(30) Foreign Application Priority Data

Dec. 18, 2017 (JP) .............................. JP2017-241996

(51) Int. Cl.
*B60W 30/14* (2006.01)

(52) U.S. Cl.
CPC ..... *B60W 30/143* (2013.01); *B60W 2520/105* (2013.01); *B60W 2540/10* (2013.01); *B60W 2720/106* (2013.01)

(58) Field of Classification Search
CPC ......... B60W 30/143; B60W 2520/105; B60W 2540/10; B60W 2720/106; B60K 2026/026; F02D 2200/602
See application file for complete search history.

(56) References Cited

U.S. PATENT DOCUMENTS

| 2006/0224291 A1* | 10/2006 | Geist | B60W 10/11 |
| | | | 701/51 |
| 2014/0116379 A1* | 5/2014 | Maruyama | G05G 1/30 |
| | | | 123/349 |
| 2015/0019091 A1* | 1/2015 | Okada | B60W 10/06 |
| | | | 701/54 |
| 2016/0339780 A1* | 11/2016 | Yagi | B60K 26/02 |

FOREIGN PATENT DOCUMENTS

| JP | 2015-017570 A | 1/2015 |
| JP | 2016-217292 A | 12/2016 |

* cited by examiner

*Primary Examiner* — Anne Marie Antonucci
*Assistant Examiner* — Andrew J Cromer
(74) *Attorney, Agent, or Firm* — Oliff PLC

(57) ABSTRACT

A drive force control system for improving operational easiness of an accelerator. The control system is configured to: set a slope of a target acceleration such that the target acceleration is increased with a reduction in a vehicle speed; detect an operating period of the accelerator between turning points at which an operating speed of the accelerator is changed from a low speed to a high speed; set the slope of the target acceleration in accordance with the detected operating period; and set the slope of the target acceleration of a case in which the operating period of the accelerator is longer than a predetermined operating period steeper than the slope of the target acceleration set in accordance with the predetermined operating period.

8 Claims, 5 Drawing Sheets

DRIVE FORCE CONTROL SYSTEM FOR VEHICLE

CROSS REFERENCE TO RELATED APPLICATIONS

The present disclosure claims the benefit of Japanese Patent Application No. 2017-241996 filed on Dec. 18, 2017 with the Japanese Patent Office, the disclosure of which are incorporated herein by reference in its entirety.

BACKGROUND

Field of the Disclosure

Embodiments of the present application relate to the art of a drive force control system for a vehicle, and more particularly, to a drive force control system configured to individualize a control of a drive force to conform to a preference of a driver.

Discussion of the Related Art

An accelerating operation, a braking operation, a steering operation etc. differ on an operating preference of a driver. For example, some of drivers operate an accelerator and a steering device in such a manner as to operate a vehicle in an agile manner. By contrast, some of drivers operate the accelerator and the steering device in such a manner as to operate the vehicle in a mild manner. However, characteristics of a drive force and steering etc. differ depending on a model and a grade of the vehicle. That is, driving characteristics of the vehicle may not conform completely to a driving preference of each driver. Therefore, it is preferable to adjust the driving characteristics of the vehicle to the driving preference of the driver as much as possible. In addition, if the driver changes frequently, it is difficult to adjust the driving characteristics of the vehicle to the driving preference of each driver.

JP-A-2015-017570 describes a vehicle control system for controlling a driving force of a vehicle in which a vehicle travel mode can be shifted between a normal mode and a sport mode. According to the teachings of JP-A-2015-017570, a target acceleration is set in accordance with an accelerator angle and a vehicle speed, and a speed ratio and an output power of an engine are controlled in such a manner as to achieve the target acceleration. The target acceleration is reduced with an increase in the vehicle speed. In the sport mode, the target acceleration is increased compared to that in the normal mode, and a difference between the target accelerations in the sport mode and the normal mode is reduced with an increase in the vehicle speed. JP-A-2016-217292 describes a control device for controlling an output power of an engine. According to the teachings of JP-A-2016-217292, a relation between a vehicle speed and a target acceleration is determined in accordance with an angle of an accelerator pedal, and the output power of the engine is controlled in such a manner as to achieve the target acceleration.

Thus, according to the teachings of JP-A-2015-017570 and JP-A-2016-217292, the target acceleration is set in accordance with a position of the accelerator pedal. Therefore, the vehicle is allowed to be operated in line with the driver's intention. However, the position of the accelerator pedal on which the target acceleration is based may be changed unintentionally in various patterns. For example, when the driver depress the accelerator pedal to increase a vehicle speed to a desired speed while observing a speed indicated by a speedometer, the driver may stop a depression of the accelerator pedal temporarily or return the accelerator pedal slightly, and thereafter, depress the accelerator pedal again less than before and stop the depression or return the accelerator pedal again. Such pattern may be repeated.

The above-explained interruption of the operation of the accelerator pedal may also occur when decelerating the vehicle by returning the accelerator pedal. Such interruption and depression are caused unintentionally but out of habit of the driver, and a cycle of the interruption and depression varies by individual. According to the teachings of JP-A-2015-017570 and JP-A-2016-217292, the drive force may not be controlled taking account of such unintentional operation of the accelerator pedal. For example, if a driver whose cycle between the unintentional depression of the accelerator pedal and interruption of depression of the accelerator pedal is long drives a vehicle adapted to a driver whose said cycle is short, an actual vehicle speed may differ from a target speed e.g., during cruising.

SUMMARY

Aspects of the present disclosure have been conceived noting the foregoing technical problems, and it is therefore an object of the present disclosure to provide a drive force control system for a vehicle configured to reduce a difference between a target vehicle speed and an actual vehicle speed to improve an operational easiness of the vehicle.

The drive force control system for vehicle according to the embodiment of the present disclosure is configured to set a slope of a target acceleration as a change amount of the target acceleration with respect to a change amount of a vehicle speed in accordance with an operating amount of an accelerator and the vehicle speed, and to control a drive force to achieve the target acceleration determined based on the slope of the target acceleration. The drive force control system is provided with a controller that calculates the slope of the target acceleration. Specifically, the controller is configured to: set the slope of the target acceleration such that the target acceleration is increased in a direction to accelerate the vehicle at a lower speed; detect an operating period of the accelerator between turning points at which an operating speed of the accelerator is changed from a low speed to a high speed when the operating amount of the accelerator changes within a predetermined period of time; set the slope of the target acceleration in accordance with the detected operating period of the accelerator; and set the slope of the target acceleration of a case in which the operating period of the accelerator is longer than a predetermined operating period steeper than the slope of the target acceleration set in accordance with the predetermined operating period.

In a non-limiting embodiment, the controller may be further configured to detect the operating period of the accelerator from a point at which the operating speed of the accelerator is increased from zero to a point at which the operating speed of the accelerator is reduced to zero.

In a non-limiting embodiment, the controller may be further configured to: detect a plurality of the operating periods of the accelerator; calculate an average operating period of the accelerator by averaging the detected operating periods of the accelerator; and set the slope of the target acceleration based on the average operating period of the accelerator.

In a non-limiting embodiment, the accelerator may include an accelerator pedal. The controller may be further configured to detect a depressing amount of the accelerator pedal as the operating amount of the accelerator. The operating speed of the accelerator may include a temporal differentiation of the depressing amount of the accelerator pedal.

In a non-limiting embodiment, the operating period of the accelerator may include a period between time points at which the temporal differentiation of the depressing amount of the accelerator pedal is respectively zero.

In a non-limiting embodiment, the controller may be further configured to inhibit detection of the operating period of the accelerator in a case that a change amount of the operating amount of the accelerator is smaller than a predetermined value.

In a non-limiting embodiment, the controller may be further configured to reduce a rate to reduce the slope of the target acceleration slower than a rate to increase the slope of the target acceleration with respect to the vehicle speed, in a case that the operating period is reduced and hence the slope of the target acceleration with respect to the vehicle speed is reduced smaller than a value before the operating period is reduced.

Thus, according to the embodiment of the present disclosure, an unintentional change in the operating speed of the accelerator and the operating period of the accelerator between the turning points at which the operating speed of the accelerator is changed from a low speed to a high speed. Such operating period varies depending on an individual difference or a habit of the driver. In addition, the operating period also varies depending on a fatigue of the driver, a road congestion, a carefulness of the driver when e.g., pulling into another lane, a reduction in visibility due to weather and so on. According to the embodiment of the present disclosure, the slope of the target acceleration is increased with an increase in the detected operating period of the accelerator. Specifically, the "slope" of the target acceleration is a change amount of the target acceleration with respect to a change amount of a vehicle speed, in the Cartesian coordinate between the vehicle speed and the target acceleration. During propulsion while operating the accelerator in a predetermined amount, when the vehicle speed is changed e.g., by a road gradient, the slope of the target acceleration is changed from the previous value so that the target acceleration is changed from the previous value. That is, the accelerating control or a decelerating control is executed. In this situation, if the vehicle is operated by a driver whose operating period of the accelerator is long, the operation of the accelerator to adjust the vehicle speed to the previous speed may be delayed significantly. However, according to the embodiment of the present disclosure, the control to adjust the vehicle speed to the previous speed is executed before the actual vehicle speed deviates significantly from the target speed. As a result, the vehicle is accelerated or decelerated so that the difference between the actual vehicle speed and the target speed is reduced. For this reason, a required operating amount and an operating frequency of the accelerator can be reduced. That is, an operational burden on the driver to maintain the vehicle speed to the target speed can be reduced. By contrast, if the vehicle is operated by a driver whose operating period of the accelerator is short, the slope of the target acceleration is set milder compared to a case in which the operating period of the accelerator is long. In this case, when the vehicle speed deviates from the target speed determined based on the current operating amount of the accelerator, the adjustment of the vehicle speed to the target speed is executed immediately. For this reason, a required operating amount and an operating frequency of the accelerator may also be reduced. That is, an operational burden on the driver to maintain the vehicle speed to the target speed may also be reduced.

The slope of the target acceleration may be set based on the average operating period of the accelerator. According to the embodiment of the present disclosure, therefore, individual difference or habit of the driver to operate the accelerator may be reflected accurately on the slope of the target acceleration while eliminating disturbance factors.

In the case that the change amount of the operating amount of the accelerator is smaller than the predetermined value, detection of the operating period of the accelerator is inhibited. For this reason, a control accuracy of drive force may be improved while eliminating data about the operating period containing an error.

In the case that the operating period is changed and hence the slope of the target acceleration is reduced, the rate to reduce the slope of the target acceleration is reduced. For this reason, it is not necessary for the driver to operate the accelerator significantly and abruptly to maintain the vehicle speed to the target speed. That is, the operational easiness of the vehicle can be improved. Especially, the driver can be prevented from feeling an excessive change in vehicle behavior with respect to the operation of the accelerator.

BRIEF DESCRIPTION OF THE DRAWINGS

Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Figure 1:
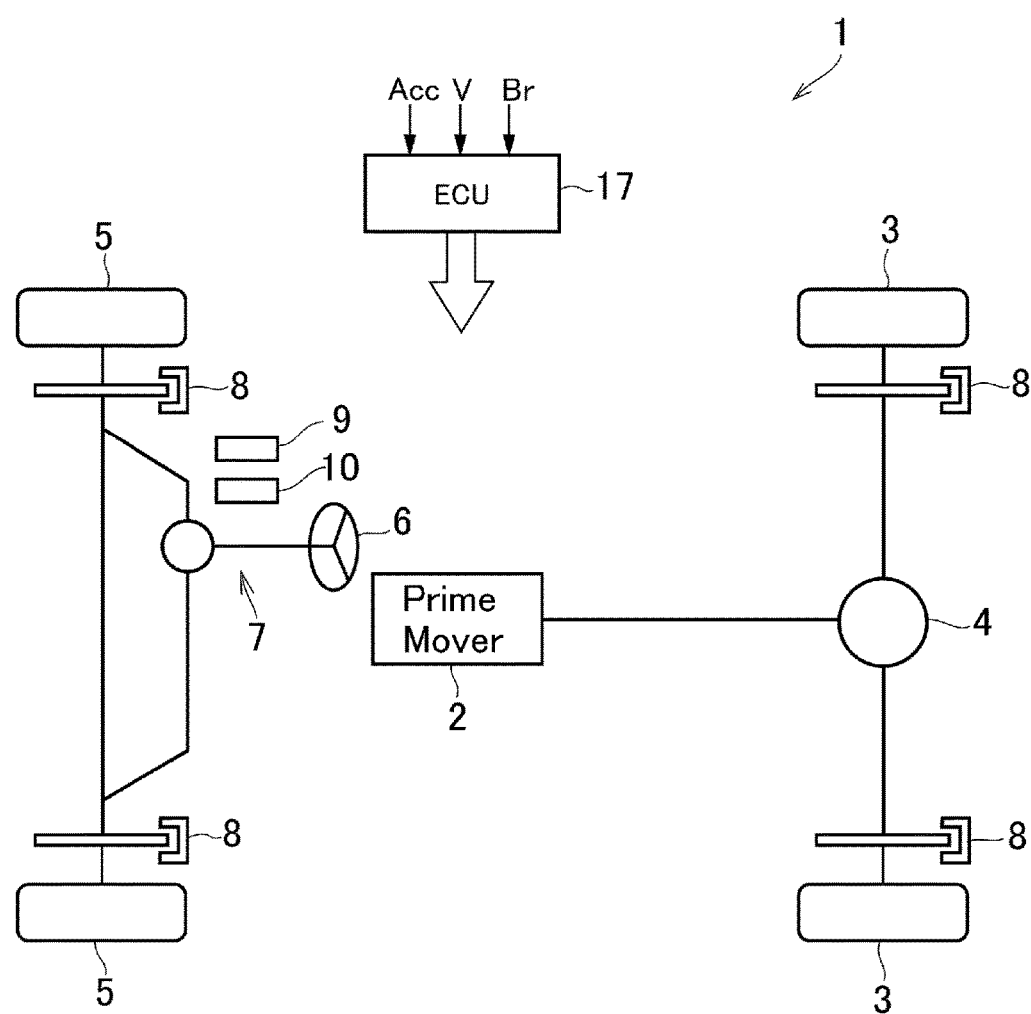
FIG. 1 is a schematic illustration showing one example of a structure of the drive force control system according to the embodiment of the present disclosure.

An embodiment of the present disclosure will now be explained with reference to the accompanying drawings. Referring now to FIG. 1, there is schematically shown a structure of a vehicle 1 to which the control system according to the embodiment of the present disclosure is applied. The vehicle 1 is a rear-drive layout vehicle in which a pair of rear wheels 3 is driven by an output torque of a prime mover 2 to propel the vehicle 1. The prime mover 2 may include an internal combustion engine, a motor, and both of the engine and the motor. A differential gear unit 4 is connected to the prime mover 2 so that a drive force generated by the prime mover 2 is distributed to the right rear wheel 3 and the left rear wheel 3. A pair of front wheels 5 is turned by rotating a steering wheel 6 of a steering mechanism 7. Each of the front wheels 5 and the rear wheels 3 is individually provided with a brake device 8. Not only an electric brake device but also a hydraulic brake device may be adopted as each of the brake devices 8, and each of the brake devices 8 is activated upon reception of a braking command signal transmitted in response to a braking operation.

The vehicle 1 is provided with an accelerator pedal 9 for accelerating or decelerating the vehicle 1, and a brake pedal 10 for applying a brake force to the vehicle 1.

Figure 2:
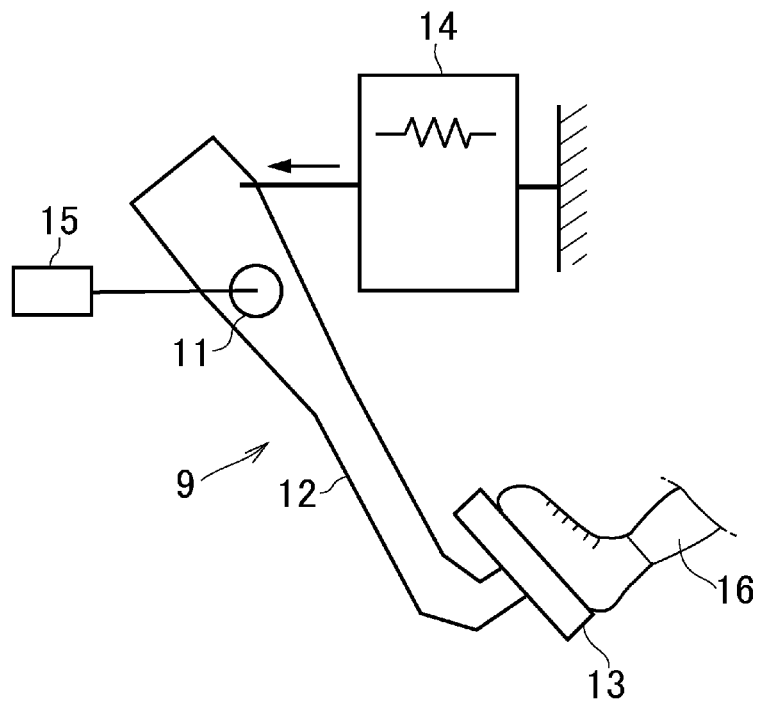
FIG. 2 is an enlarged view showing a structure of an accelerator pedal.

A structure of the accelerator pedal 9 is shown in FIG. 2 in more detail. The accelerator pedal 9 includes a lever 12 suspended from a vehicle body close to a floor (neither of which are shown) in such a manner as to pivot around a fulcrum 11 and a pedal pad 13 attached to a leading end of the lever 12. The accelerator pedal 9 is maintained or returned to an initial position by a reaction force generated by a reaction mechanism 14. That is, the accelerator pedal 9 is pivoted from the initial position to be depressed by applying a pedal force greater than the reaction force of the reaction mechanism 14 to the pedal pad 13. An operating amount of the accelerator pedal 9, that is, a depression of the accelerator pedal 9 is detected by a sensor 15, and a detected value of the depression is transmitted from the sensor 15 in the form of detection signal. For example, an angle sensor for detecting an angle of the lever 12 from the initial position when the pedal force is applied to or reduced from the pedal pad 13 by a driver 16 may be adopted as the sensor 15. Instead, a pedal force sensor for detecting the pedal force applied to the pedal pad 13 by the driver 16 may also be adopted as the sensor 15.

Although not especially shown, the brake pedal 10 also includes a lever and a pedal pad attached to a leading end of the lever. That is, the brake pedal 10 is also pivoted around a predetermined fulcrum to be depressed by applying a pedal force to the pedal pad. When the brake pedal 10 is depressed, the brake pedal 10 transmits an electric or hydraulic brake signal to actuate the brake devices 8.

In order to control the prime mover 2, the brake devices 8 and so on, the vehicle 1 is provided with an electronic control unit (to be abbreviated as the "ECU" hereinafter) 17 as a controller. The ECU 17 is composed mainly of a microcomputer configured to execute a calculation based on incident signals and data installed in advance, and to transmit a calculation result in the form of command signal. To this end, for example, the ECU 17 receives data about a vehicle speed V, a depression ACC of the accelerator pedal 9 corresponding to an operating amount of the accelerator pedal 9, and an activation signal Br of the brake device 8 transmitted when the brake pedal 10 is depressed. For example, the ECU 17 transmits command signals for controlling an output torque and an engine braking force of the prime mover 2, and a brake force (in other words, a negative drive force) of the brake device 8. In addition, if the ECU 17 includes a motor-generator, the ECU 17 also transmits command signals for controlling a regenerative torque such as a positive torque and a negative torque of the motor-generator.

Figure 3:
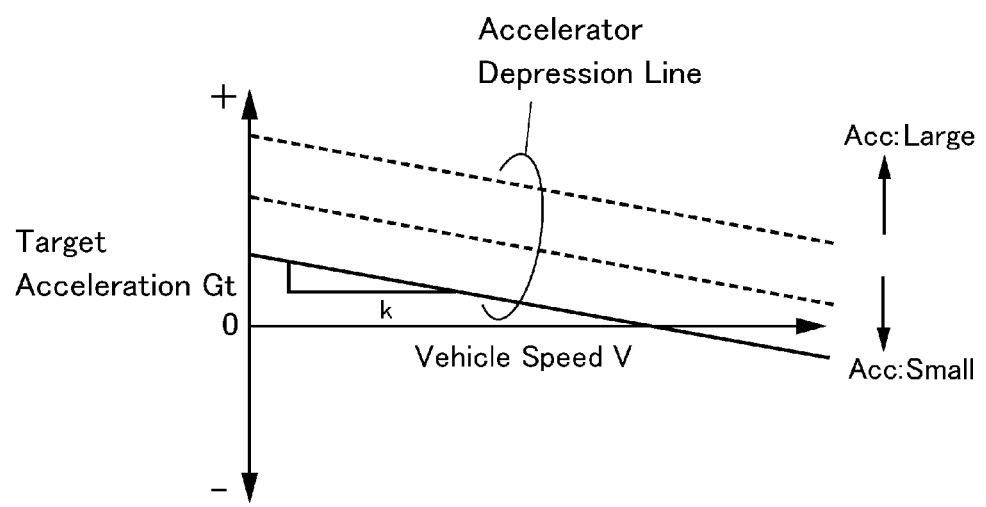
FIG. 3 is a map for determining a target acceleration of the vehicle.

For example, a map for determining a target acceleration in accordance with a vehicle speed as shown in FIG. 3 is installed in the ECU 17. In FIG. 3, the horizontal axis represents a vehicle speed V, the vertical axis represents a target acceleration Gt, and a diagonal line represents a depression ACC of the accelerator pedal 9 as a stroke of the accelerator pedal 9. In FIG. 3, the upper diagonal line (to be called the "accelerator depression line" hereinafter) indicates that the depression ACC of the accelerator pedal 9 is large. A slope k of the accelerator depression line indicates a change amount of the target acceleration Gt with respect to a change in the vehicle speed V, and the slope k is set in such a manner that the target acceleration Gt in an accelerating direction is increased with a reduction in the vehicle speed V. That is, the slope k may also be called the sensible degree k of vehicle speed, and the sensible degree k affects on the acceleration response and a drive performance of the vehicle 1. The sensible degree k may be set depending on a model and a grade of the vehicle based on a result of a simulation or an experimentation. In addition, as described later, the sensible degree k may be changed as necessary depending on an arbitrary factor.

As can be seen from the map shown in FIG. 3, the target acceleration Gt is reduced with an increase in the vehicle speed V in the forward direction. In other words, the target acceleration Gt is increased with a reduction in the vehicle speed V. At an intersection between the horizontal axis at which the target acceleration Gt is zero and the accelerator depression line, the current vehicle speed V can be maintained with the depression ACC of the accelerator pedal 9 indicated by the accelerator depression line. At a vehicle speed V lower than the horizontal axis at which the target acceleration Gt is zero, the target acceleration Gt turns to a negative value and hence a brake force is generated. A relation between the target acceleration Gt and the drive force or the brake force is identical to a relation between the acceleration and the force according to a conventional mechanics. That is, a product of the target acceleration Gt, a vehicle weight, and a running load is equal to the drive force or the brake force. Accordingly, as a result of setting the target acceleration Gt, the drive force or the brake force may be substituted by the target acceleration Gt.

Figure 4:
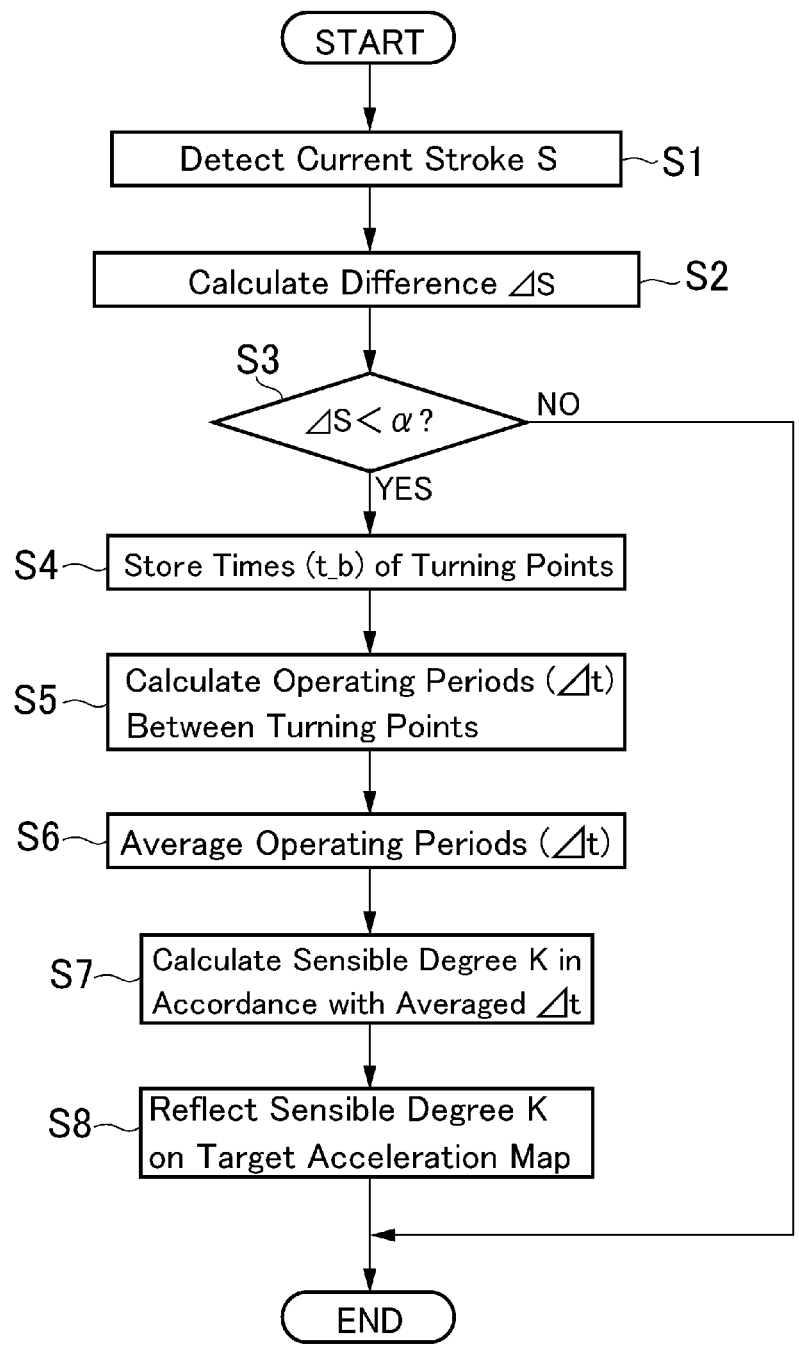
FIG. 4 is a flowchart showing an example of a routine executed by the drive force control system according to the embodiment of the present disclosure.

The drive force control system according to the embodiment of the present disclosure is configured to change the sensible degree k of vehicle speed in accordance with an operating manner of the accelerator pedal 9 by the driver 16, that is, a changing manner of a depression of the accelerator pedal 9. To this end, the ECU 17 execute the routine shown in FIG. 4 during propulsion of the vehicle 1 repeatedly at predetermined time intervals (e.g., in every several milliseconds).

At step S1, a current operating amount of the accelerator is detected. As described, an operating amount of the accelerator corresponds to an operating amount of the accelerator pedal 9. Therefore, a physical amount to operate the accelerator pedal, for example, a stroke S of the accelerator pedal 9 including a depressing amount and a returning amount of the accelerator pedal 9, or a pedal force applied to the pedal pad 13 may be detected at step S1. In the routine shown in FIG. 4, specifically, the stroke S of the accelerator pedal 9 is detected at step S1. The stroke S of the accelerator pedal 9 may be detected by the sensor 15, and a detection value of the stroke S is stored in a predetermined memory. In the memory, for example, several hundreds to several thousands of past data about the stroke S are stored so that the ECU 17 is allowed to determine a cycle or habit of the driver 16 to operate the accelerator pedal 9. In order not to collect data about the stroke S of the accelerator pedal 9 when the vehicle 1 waits at a traffic signal or runs in a traffic jam, it is preferable to set an upper limit of the data collected during propulsion at a low speed or time to collect the data during propulsion at a low speed. Instead, it is also possible to collect the data about the stroke S of the accelerator pedal 9 only when the vehicle speed V is higher than a predetermined level. Thus, according to the embodiment of the present disclosure, the following controls will be executed based on a change in the operating amount of the accelerator pedal 9.

Then, a difference ΔS between the previously detected stroke S and the currently detected stroke S is calculated at step S2. For example, at step S2, a difference ΔS between the stroke S detected in the previous routine and the currently detected stroke S may be calculated. Instead, at step S2, it is also possible to calculate a difference ΔS between the stroke S detected in the two or more routines ago and the currently detected stroke S, depending on a required control accuracy and a cycle time to execute the routine shown in FIG. 4.

Figure 5:
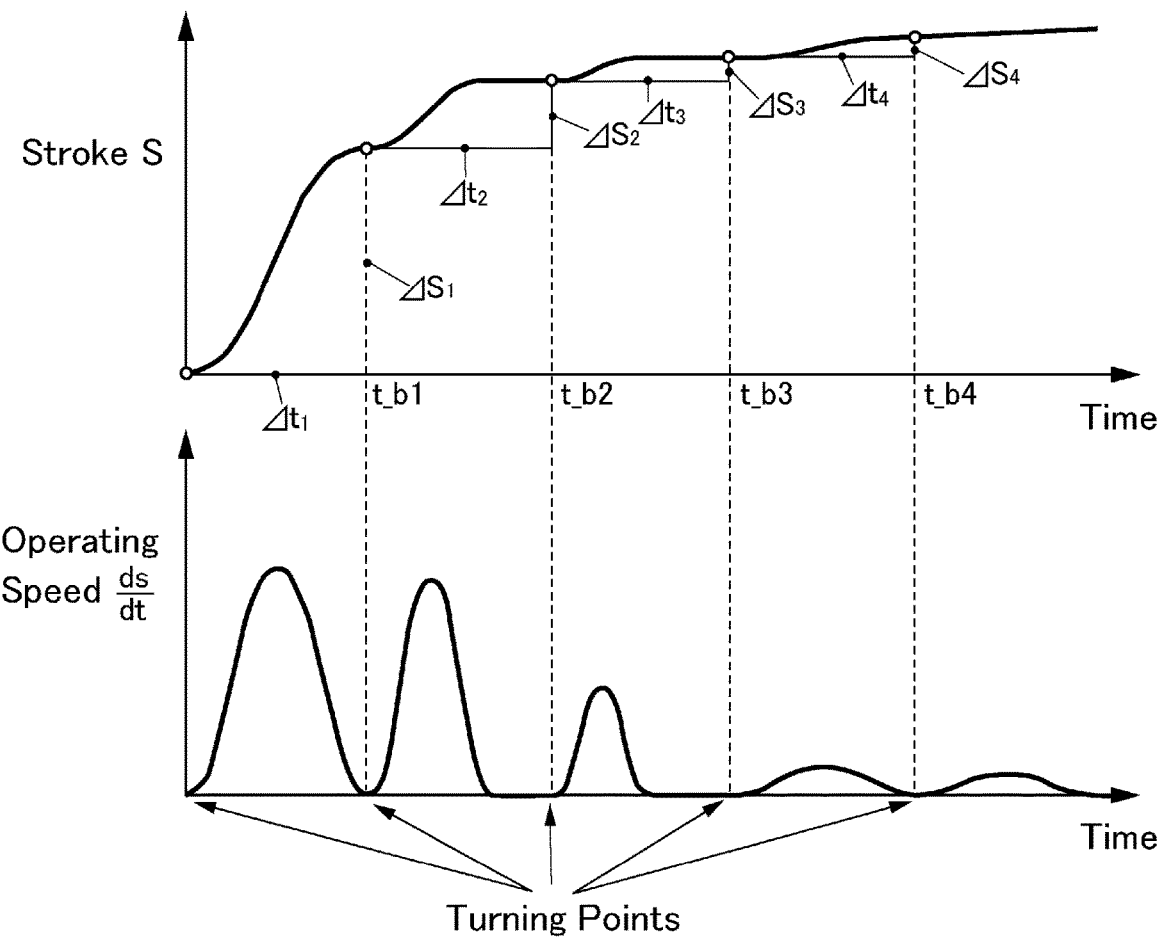
FIG. 5 is a time chart showing periodic change in a stroke of the accelerator pedal and operating speed of the accelerator pedal.

Here will be explained an example of a change in the stroke S of the accelerator pedal 9 with reference to FIG. 5. During propulsion of the vehicle 1, the driver 16 operates the accelerator pedal 9 in such a manner as to propel the vehicle 1 at an intended speed. In this situation, when the vehicle speed V indicated by a speedometer deviates from the intended speed, the driver 16 depresses or returns the accelerator pedal 9. In most cases, such operation of the accelerator pedal 9 is executed stepwise involuntarily or unconsciously as indicated in FIG. 5. In the initial phase of depression of the accelerator pedal 9, the stroke S of the accelerator pedal changes relatively significantly. Then, a depressing speed of the accelerator pedal 9 is temporarily reduced, or the depression of the accelerator pedal is temporarily interrupted, and thereafter, the accelerator pedal is depressed again. That is, the operating speed of the accelerator pedal 9 is increased and reduced, and a period of time to reduce the depressing speed or to hold the accelerator pedal 9 becomes longer stepwise. In other words, a change amount ΔS per operation of the accelerator pedal 9 (i.e., Δ1, Δ2, Δ3, Δ4) is reduced gradually. When the depression ACC of the accelerator pedal 9 reaches an intended degree, or when the vehicle speed V reaches the intended speed, the stroke S of the accelerator pedal 9 is maintained.

A change in the operating speed of the accelerator pedal 9 in the above-mentioned situation is also indicated in FIG. 5. The operating speed of the accelerator pedal 9 may be expressed as a temporal differentiation of the stroke S of the accelerator pedal 9 (ds/dt). In the curve indicating the operating speed of the accelerator pedal 9, lower turning points are formed at time points when the temporal differentiation of the stroke S is substantially zero. That is, the operating speed of the accelerator pedal 9 is changed from a low speed to a high speed at each of the lower turning points, and each period between the adjacent lower turning points is an operating period Δt of the accelerator pedal 9. The operating period Δt varies from person to person, and depending on the running condition. For example, the operating period Δt increases when the driver 16 operates the vehicle 1 carefully side by side with the other vehicles, when the driver 16 waits for opportunity to pull into another lane, and when visibility is poor in the nighttime or due to bad weather.

Turning back to FIG. 3, it is determined at step S3 whether the change amount ΔS is smaller than a predetermined value α. A detection value of the sensor for detecting an operating amount of the accelerator pedal 9 inevitably contains a detection error. In addition, the stroke S of the accelerator pedal 9 may be changed by a disturbance such as an accidental change in the running condition. Therefore, such determination at step S3 is executed to maintain a control accuracy by eliminating those disturbance factors. To this end, the predetermined value α may be set in advance based on a result of experimentation or simulation. If the change amount ΔS is great than a predetermined value α so that the answer of step S3 is NO, the routine is terminated without executing the controls subsequent steps. That is, the detection of the operating period is inhibited.

By contrast, if the answer of step S3 is YES, the routine progresses to step S4 to store a time t_b (t_b1, t_b2, t_b3, t_b4) of each of the lower turning points, and further progresses to step S5 to calculate each of the operating periods Δt between the adjacent stored lower turning points. Then, the operating periods Δt calculated at step S5 are averaged at step S6. As described, the operating period Δt may contain an error resulting from a temporal disturbance factor, and hence the operating period Δt may not directly represent individual difference or habit of the driver 16. Therefore, such averaging procedure at step S6 is executed to eliminate the disturbance factors as much as possible. Such averaging at step S6 may be executed by a simple averaging method, and number of data to be averaged may be determined arbitrarily taking account of a balance between a stability of the values and a response of a case in which the values are changed. Here, the averaging procedure at step S6 is not an essential procedure, and may be executed according to need.

Figure 6:
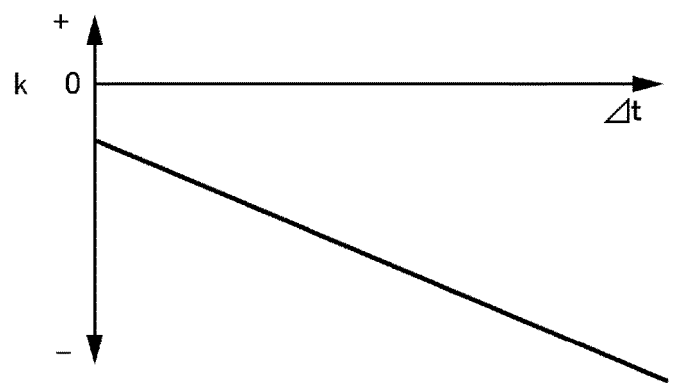
FIG. 6 is a map determining a relation between an operating period and a sensible degree of vehicle speed.

Then, at step S7, the sensible degree k of vehicle speed is calculated in accordance with the operating period Δt. In a case that the averaging procedure at step S6 has been executed, the sensible degree k of vehicle speed is calculated in accordance with the operating period Δt averaged at step S6. Otherwise, in a case that the averaging procedure at step S6 is skipped, the sensible degree k of vehicle speed may also be calculated in accordance with the operating periods Δt calculated at step S5. A relation between the operating period Δt and the sensible degree k of vehicle speed may be determined in the form of map based on a result of simulation or experimentation, in such a manner as not to reduce the acceleration response and not to change the drive force excessively. One example of the map is shown in FIG. 6. As shown in FIG. 3, the sensible degree k of vehicle speed is an index of negative value to incline the accelerator depression line diagonally right down. In FIG. 6, accordingly, the sensible degree k of vehicle speed is indicated as a negative value. As can be seen from FIG. 6, specifically, the sensible degree k of vehicle speed is reduced with an increase in the operating period Δt (in other words, an absolute value is increased, or increased in the negative direction).

Figure 7:
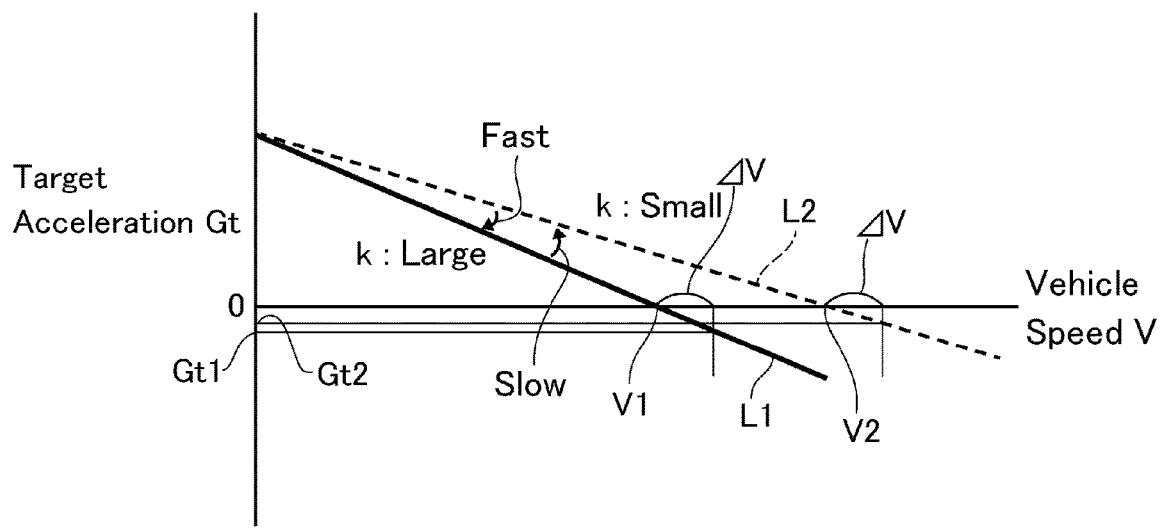
FIG. 7 is a map determining the target acceleration of a case in which the sensible degree of the vehicle speed is large, and the target acceleration of a case in which the sensible degree of the vehicle speed is small.

The sensible degree k of vehicle speed thus obtained is reflected on the target acceleration map at step S8, and thereafter, the routine returns. FIG. 7 shows an example of changing the sensible degree k of the accelerator depression line. In FIG. 7, the solid line L1 is the accelerator depression line in which an absolute value of the sensible degree k is large, and the dashed line L2 represents the accelerator depression line in which an absolute value of the sensible degree k is small. For example, given that the operating period Δt is long, an inclination of the accelerator depression line becomes steeper. In other words, given that a difference in the vehicle speed from the target speed (i.e., a speed deviation) is same, the target acceleration Gt of a case in which the sensible degree k is large is greater than the target acceleration Gt of a case in which the sensible degree k is small. That is, at step S8, the target acceleration Gt is increased in accordance with the operating period Δt.

Here will be explained an advantage to be achieved by thus adjusting the sensible degree k of vehicle speed in accordance with the operating period Δt. In FIG. 7, a target vehicle speed is indicated at an intersection between the diagonal accelerator depression line and the horizontal axis at which the target acceleration Gt is zero. Specifically, a target vehicle speed V1 of the case in which an operating speed of the accelerator pedal 9 is slow and the sensible degree k is large is indicated at an intersection between the solid line L1 and the horizontal axis at which the target acceleration Gt is zero. Likewise, a target vehicle speed V2 of the case in which an operating speed of the accelerator pedal 9 is fast and the sensible degree k is small is indicated at an intersection between the dashed line L2 and the horizontal axis at which the target acceleration Gt is zero. For example, the vehicle speed V increases on a downslope, and when the difference between the current vehicle speed V and the target vehicle speed V1 or V2 reaches a predetermined value ΔV, the target acceleration Gt turns into a negative value. Specifically, as indicated in FIG. 7, the target acceleration Gt is set to Gt1 in the case that the sensible degree k is large, and set to Gt2 in the case that the sensible degree k is small. Due to difference in the sensible degree k of vehicle speed, an absolute value of the target acceleration Gt1 is greater than an absolute value of the target acceleration Gt2 (Gt1>Gt2). That is, given that the operating speed of the accelerator pedal 9 is slow and hence the sensible degree k is large, the target acceleration Gt is increased in comparison with the case in which the operating speed of the accelerator pedal 9 is fast. Consequently, acceleration (or drive force) or deceleration (or brake force) is increased to adjust the vehicle speed to the target speed even if the operating speed of the accelerator pedal 9 is slow.

In other words, a change amount (or change width) of the target acceleration Gt is increased by the driver 16 whose operating period Δt is long, and the target acceleration Gt is changed in the direction to adjust the vehicle speed to the target speed. For this reason, even if the operating speed of the accelerator pedal 9 is slow, the target acceleration Gt is increased to adjust the vehicle speed to the target speed in a condition where the vehicle speed deviates from the target speed only slightly. Consequently, an output torque, a regeneration amount of energy, and an engine braking torque of the prime mover 2, and a brake torque of the brake device 8 are controlled on the basis of the target acceleration Gt thus increased. As a result, the vehicle 1 is accelerated or decelerated so that the difference between the actual vehicle speed and the target speed is reduced. Thus, even if the operation of the accelerator pedal is required to maintain the vehicle speed to the target speed, according to the embodiment of the present disclosure, a required operating amount and an operating frequency of the accelerator pedal 9 are reduced. That is, an operational burden on the driver 16 to maintain the vehicle speed to the target speed can be reduced. In other words, the driver 16 is allowed at least to cruise the vehicle 1 easily.

According to the embodiment of the present disclosure, the operating period Δt is calculated sequentially, and the sensible degree k of vehicle speed and the target acceleration Gt are adjusted in accordance with the operating period Δt. If the target acceleration Gt or the drive force is changed significantly or rapidly, drivability of the vehicle 1 may be changed suddenly and hence the driver 16 may feel uncomfortable feeling. For example, in the case that an absolute value of the sensible degree k of vehicle speed is reduced, the operating period Δt is reduced. In this situation, therefore, a required operating amount of the accelerator pedal 9 to adjust the vehicle speed to the target speed is increased suddenly if the absolute value of the sensible degree k is reduced suddenly. Consequently, an operating amount and an operating frequency of the accelerator pedal 9 may be increased excessively to reduce operational easiness of the vehicle 1. In order to avoid such disadvantage, it is preferable to restrict a changing rate of the target acceleration Gt with respect to the vehicle speed V or the sensible degree k to a predetermined rate, by restricting a change amount of the target acceleration Gt (per depression) lower than a predetermined value. For example, in a case of increasing an absolute value of the sensible degree k of vehicle speed from the sensible degree k indicated by the dashed line L2 to the sensible degree k indicated by the solid line L1, the absolute value of the sensible degree k is changed at a predetermined rate (referred to as "fast" in FIG. 7) determined by design. Otherwise, in a case of reducing an absolute value of the sensible degree k of vehicle speed from the sensible degree k indicated by the solid line L1 to the sensible degree k indicated by the dashed line L2, the absolute value of the sensible degree k is changed at a rate (referred to as "slow" in FIG. 7) slower than the above-mentioned rate. As a result, the reduction in the operational easiness of the vehicle 1 can be prevented.

As can be seen from FIG. 7, given that the absolute value of the sensible degree k of vehicle speed is large, a change amount of the target acceleration Gt with respect to a change amount in the vehicle speed V (in other words, a change rate of the target acceleration Gt with respect to the vehicle speed V) is large. Therefore, in a case of maintaining an operating amount of the accelerator pedal 9 to a predetermined amount to adjust the actual vehicle speed to the target speed, the target acceleration Gt and the drive force are reduced with a progression of adjustment of the vehicle speed to the target speed. Especially, the target acceleration Gt and the drive force will be reduced significantly with an increase in the sensible degree k of vehicle speed. In this case, the driver may feel an acceleration plateau due to such significant reduction in the acceleration or the drive force. In order to avoid such disadvantage, in a case of increasing an absolute value of the sensible degree k of vehicle speed, it is preferable to restrict the sensible degree k lower than an upper limit value set based on a result of simulation or experimentation.

Although the above exemplary embodiments of the present disclosure have been described, it will be understood by those skilled in the art that the present disclosure should not be limited to the described exemplary embodiments, and various changes and modifications can be made within the scope of the present disclosure. For example, the target acceleration may also be changed exponentially or stepwise at predetermined vehicle speed ranges, instead of changing linearly. In the case of changing the target acceleration linearly, a slope or a sensible degree of vehicle speed may be a slope of a tangent line of a quadric curve. In the case of changing the target acceleration exponentially, a slope or a sensible degree of vehicle speed may be a slope of a tangent line of a quadric curve. In the case of changing the target acceleration stepwise, a slope or a sensible degree of vehicle speed may be a slope drawn by connecting center values of the vehicle speed ranges. In addition, the drive force control system according to the embodiment of the present disclosure may also be applied to a front-drive layout vehicle and a four-wheel-drive layout vehicle. In a vehicle having a transmission, in order to adjust a vehicle speed to a target speed, drive force and brake force may be controlled by changing a speed ratio of the transmission. Further, the sensible degree of vehicle speed may also be reduced by the foregoing procedures, and a vehicle speed may also be adjusted to a target speed by the foregoing procedures when the vehicle speed is reduced from the target speed. Further-more, the time point defining the operating period Δt, that is, the turning point at which the operating speed of the accelerator pedal 9 is changed from a low speed to a high speed may be shifted to another point at which the operating speed of the accelerator pedal 9 is increased after being reduced.

What is claimed is:

1. A drive force control system for a vehicle that is configured to set a slope of a target acceleration as a change amount of the target acceleration with respect to a change amount of a vehicle speed based on an operating amount of an accelerator and the vehicle speed, and to control a drive force to achieve the target acceleration determined based on the slope of the target acceleration, the drive force control system comprising:
a controller configured to:
set the slope of the target acceleration such that the target acceleration is increased in a direction to accelerate the vehicle at a lower speed,
detect an operating period of the accelerator between turning points at which an operating speed of the accelerator is changed from a low speed to a high speed when the operating amount of the accelerator changes within a predetermined period of time,
set the slope of the target acceleration based on the detected operating period of the accelerator, and
in response to the operating period of the accelerator being longer than a predetermined operating period for the accelerator, set the slope of the target acceleration steeper than the slope of the target acceleration set based on the predetermined operating period for the accelerator.

2. The drive force control system for the vehicle as claimed in claim 1, wherein the controller is further configured to detect the operating period of the accelerator from a point at which the operating speed of the accelerator is increased from zero to a point at which the operating speed of the accelerator is reduced to zero.

3. The drive force control system for the vehicle as claimed in claim 1, wherein
the controller is further configured to:
detect a plurality of the operating periods of the accelerator,
calculate an average operating period of the accelerator by averaging the detected operating periods of the accelerator, and
set the slope of the target acceleration based on the average operating period of the accelerator.

4. The drive force control system for the vehicle as claimed in claim 1, wherein
the accelerator includes an accelerator pedal,
the controller is further configured to detect a depressing amount of the accelerator pedal as the operating amount of the accelerator, and
the operating speed of the accelerator includes a temporal differentiation of the depressing amount of the accelerator pedal.

5. The drive force control system for the vehicle as claimed in claim 4, wherein the operating period of the accelerator includes a period between time points at which the temporal differentiation of the depressing amount of the accelerator pedal is respectively zero.

6. The drive force control system for the vehicle as claimed in claim 1, wherein the controller is further configured to inhibit detection of the operating period of the accelerator in response to a change amount of the operating amount of the accelerator being smaller than a predetermined value.

7. The drive force control system for the vehicle as claimed in claim 1, wherein
the controller is further configured to:
reduce a rate to reduce the slope of the target acceleration slower than a rate of increasing the slope of the target acceleration with respect to the vehicle speed in response to a reduction in the operating period, such that the slope of the target acceleration with respect to the vehicle speed is reduced smaller than a value before the operating period is reduced.

8. A drive force control method for a vehicle that is configured to set a slope of a target acceleration as a change amount of the target acceleration with respect to a change amount of a vehicle speed based on an operating amount of an accelerator and the vehicle speed, and to control a drive force to achieve the target acceleration determined based on the slope of the target acceleration, the drive force control method comprising:
setting the slope of the target acceleration such that the target acceleration is increased in a direction to accelerate the vehicle at a lower speed,
detecting an operating period of the accelerator between turning points at which an operating speed of the accelerator is changed from a low speed to a high speed when the operating amount of the accelerator changes within a predetermined period of time,
setting the slope of the target acceleration in the vehicle based on the detected operating period of the accelerator, and
in response to the operating period of the accelerator being longer than a predetermined operating period for the accelerator, setting the slope of the target acceleration steeper than the slope of the target acceleration set in the vehicle based on the predetermined operating period for the accelerator.

* * * * *